(12) United States Patent
Larsen (10) Patent No.: US 7,527,893 B2
(45) Date of Patent: May 5, 2009

(54) ELIMINATING INCORRECT BATTERY INSTALLATION

(75) Inventor: Glen C. Larsen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 11/439,562

(22) Filed: May 23, 2006

(65) Prior Publication Data

US 2007/0275299 A1    Nov. 29, 2007

(51) Int. Cl.
H01M 2/10    (2006.01)
(52) U.S. Cl. ...................................... 429/100
(58) Field of Classification Search ............... 429/100
See application file for complete search history.

(56) References Cited

U.S. PATENT DOCUMENTS

| | | | |
|---|---|---|---|
| 3,984,257 A | 10/1976 | Zurcher | |
| 4,578,628 A | 3/1986 | Siwiak | |
| 5,116,699 A * | 5/1992 | Miyajima | 429/100 |
| 5,376,476 A | 12/1994 | Eylon | |
| 5,431,575 A * | 7/1995 | Engira | 439/218 |
| 5,623,550 A | 4/1997 | Killion | |
| 5,909,102 A | 6/1999 | Stone, III et al. | |
| 5,962,159 A | 10/1999 | Satou et al. | |
| 6,001,504 A | 12/1999 | Batson et al. | |
| 6,023,146 A | 2/2000 | Casale et al. | |
| 6,338,914 B1 | 1/2002 | Schuurmans | |
| 6,345,464 B1 | 2/2002 | Kim | |
| 6,359,418 B1 | 3/2002 | Regan et al. | |
| 6,361,897 B1 | 3/2002 | Snyder | |
| 2006/0028175 A1 | 2/2006 | Tsiang | |

OTHER PUBLICATIONS

International Search Report PCT/US2007/009912, dated Oct. 19, 2007, pp. 1-7.
"Reverse-Current Circuitry Protection", http://pdfserv.maxim-ic.com/en/an/AN636.pdf.
"Battery Cavity Design", http://www.duracell.com/procell/design/cavity.asp.
John Guy, "Circuit provides reverse-battery protection", http://www.edn.com/article/CA56208.html.

* cited by examiner

Primary Examiner—Patrick Ryan
Assistant Examiner—Thomas H. Parsons (57) ABSTRACT

One or more dual-contact assemblies and a battery receptacle including such assemblies. A dual-contact assembly includes a positive contact, a negative contact, and an insulating connector disposed between and connecting each of the positive contact and the negative contact in an electrically insulating disposition relative to each other. A dual-contact assembly hereof can be resilient such that at least one of the positive contact, the negative contact and the insulating connector of the resilient dual-contact assembly are resiliently movable, the insulating connector maintaining the positive and negative contacts of the resilient dual-contact assembly in an electrically insulated disposition relative to each other. In a battery receptacle, at least two dual-contact assemblies are connected to a substrate in a battery receiving disposition.

20 Claims, 11 Drawing Sheets

ELIMINATING INCORRECT BATTERY INSTALLATION

BACKGROUND

Electronic power batteries must typically be properly installed in the electronic devices or products that make use of such batteries. Proper installation is commonly achieved through the use of written instructions or by using graphical directions on or in the product near or in the battery receiving area, such instructions or directions identifying the proper battery orientation for correct electrical polarity. Users often follow such instructions correctly, but at times the graphics may be difficult to see as they may have been molded directly into or as part of the product housings or the directions may have been printed on what may appear to be increasingly smaller labels. As a result, battery problems and product damage may occur. When batteries are disposed within an electronic product with incorrect polarity, the best case may be that the product simply does not work. In worse cases, batteries can overheat and leak, which can thereby cause permanent damage to the electronics, destroy the product, or cause a fire or explosion. Thus it would be desirable to achieve a solution to protect products from incorrect battery installation.

Some current methods of protection involve preventing electrical contact from occurring based on the battery terminal shape. This approach works, but if a product does not work after installing batteries, the user cannot immediately determine whether the cause is incorrect battery installation or dead or otherwise inoperable batteries. The user must then check that the batteries are installed correctly. Other methods include adding electrical current protection circuitry which may involve use of one or more diodes, rectifiers, transistors or other components. Such electrical circuitry would typically then allow current to only flow in one direction, protecting the product if the batteries are incorrectly installed. Such circuits are, however, known to reduce the supplied voltage and sap battery life by as much as 10-15% or more, and such circuitry may also be fairly expensive.

SUMMARY

Implementations described and claimed herein address the foregoing and other situations by providing a dual-contact assembly and a battery receptacle using two or more dual-contact assemblies. The dual contact assembly and battery receptacle allow batteries to be installed in any configuration, while still delivering electrical current of the proper polarity to the product at substantially all times. A receptacle may typically include two dual-contact assemblies, each of which typically being connected to a substrate in a battery receiving disposition. Each dual-contact assembly may include a positive contact, a negative contact, and an insulating connector disposed between and connecting each of the positive contact and the negative contact in an electrically insulating disposition relative to each other. Typically also, at least one and often both of the dual-contact assemblies is resilient such that at least one of the positive contact, the negative contact and the insulating connector is resiliently movable, the insulating connector nevertheless maintaining the positive and negative contacts in an electrically insulated disposition relative to each other. Further, each of the positive contacts of the respective first and second dual-contact assemblies may be electrically connected to a single positive circuit power connection, and each of the negative contacts of the respective first and second dual-contact assemblies may be electrically connected to a single negative circuit power connection. Many if not virtually any battery-powered device or product could benefit from this arrangement in that it may substantially eliminate improper or incorrect battery installations. Other implementations are also encompassed as described and recited herein.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTIONS OF THE DRAWINGS

FIG. 1, which includes sub-part FIGS. 1A and 1B, provides isometric views of a battery receptacle.

FIG. 4, which includes sub-part FIGS. 4A and 4B, provides cross-sectional views of a resilient dual-contact assembly as taken along lines 4-4 of FIGS. 1 and 2.

FIG. 5, which includes sub-part FIGS. 5A and 5B, provides bottom plan views of battery receptacle printed circuit boards useful herewith.

FIG. 6, which includes sub-part FIGS. 6A, 6B and 6C, provides electrical schematics of a battery receptacle.

FIG. 7, which includes sub-part FIGS. 7A, 7B and 7C, provides respective isometric and exploded isometric views of an alternative resilient dual-contact assembly.

FIG. 8, which includes sub-part FIGS. 8A, 8B and 8C, provides respective isometric and exploded isometric views of an alternative resilient dual-contact assembly.

FIG. 9, which includes sub-part FIGS. 9A and 9B, provides isometric views of a battery receptacle.

DETAILED DESCRIPTION

Technology is described herein for battery receptacles which substantially eliminate improper installation of one or more batteries therewithin. Such a battery receptacle allows for a battery to be installed in alternative configurations, while nonetheless providing proper polarity for and supplying an appropriate electrical current to the battery-powered electronic device at all times. As will be readily understood, such technology may be useful in a great many electronic devices which are powered by one or more batteries.

Figure 1A:
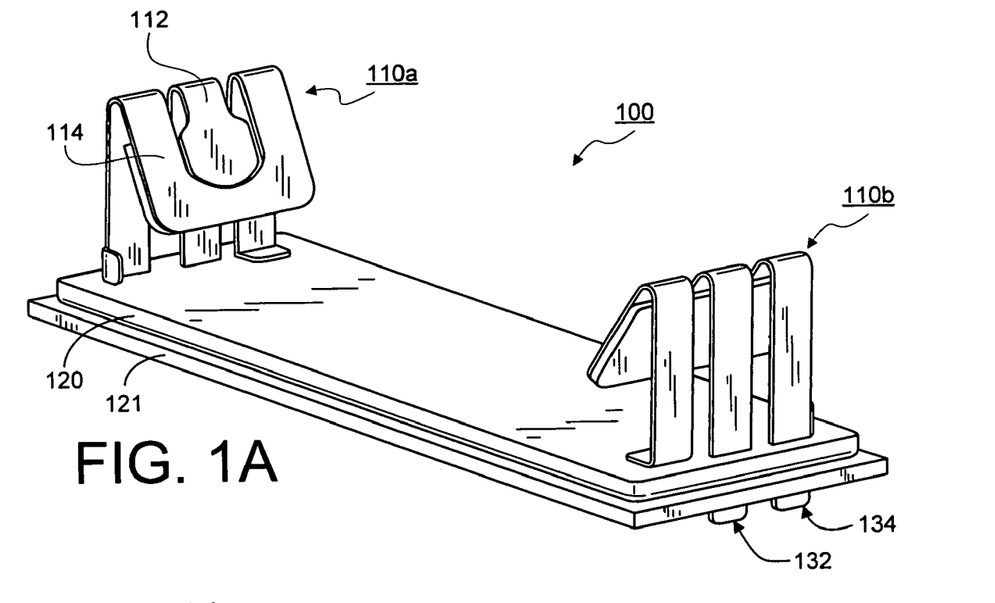
Figure 1B:
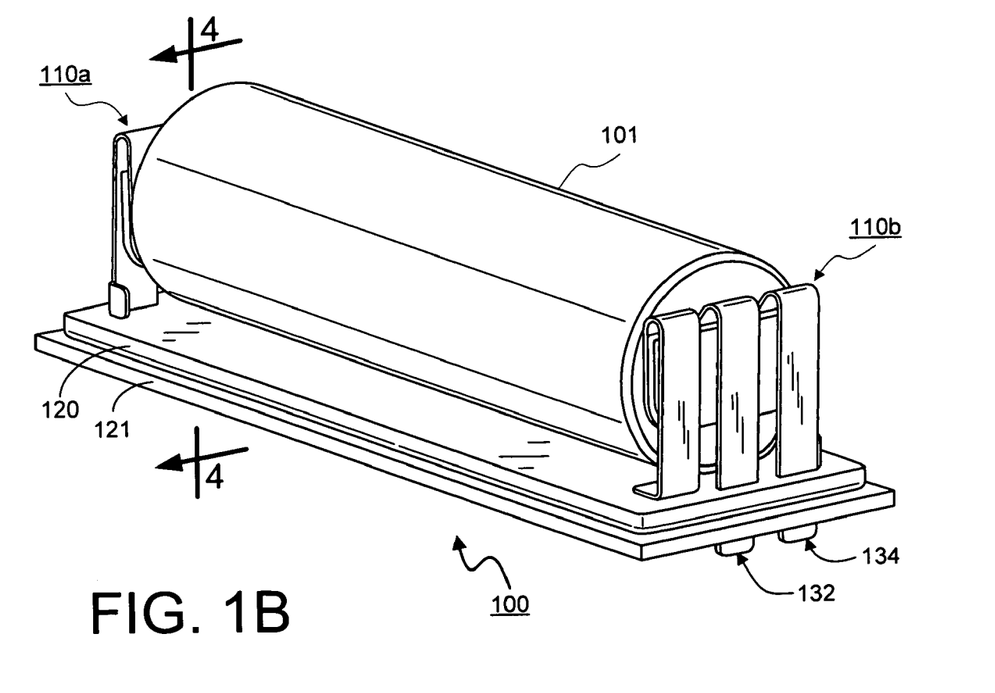

FIG. 1 illustrates an example battery receptacle 100 for a battery-powered electronic device (not shown). Such a receptacle may be disposed in a housing of such a device (neither of which being shown nor further described, here). As illustrated in both sub-part FIGS. 1A and 1B, the receptacle 100 may include two dual-contact assemblies 110, here in FIG. 1 denominated as first and second assemblies 110a and 110b, which are connected to a substrate 120 which in many instances such as that shown here includes a printed circuit board, or PCB 121. The substrate 120 and/or the PCB 121 may be used to mechanically hold the first and second assemblies in relative space or in substantially fixed orientation relative to each other. An example battery 101 is shown in dashed lines in FIG. 1B, and as shown in further detail in FIG.

Figure 2:
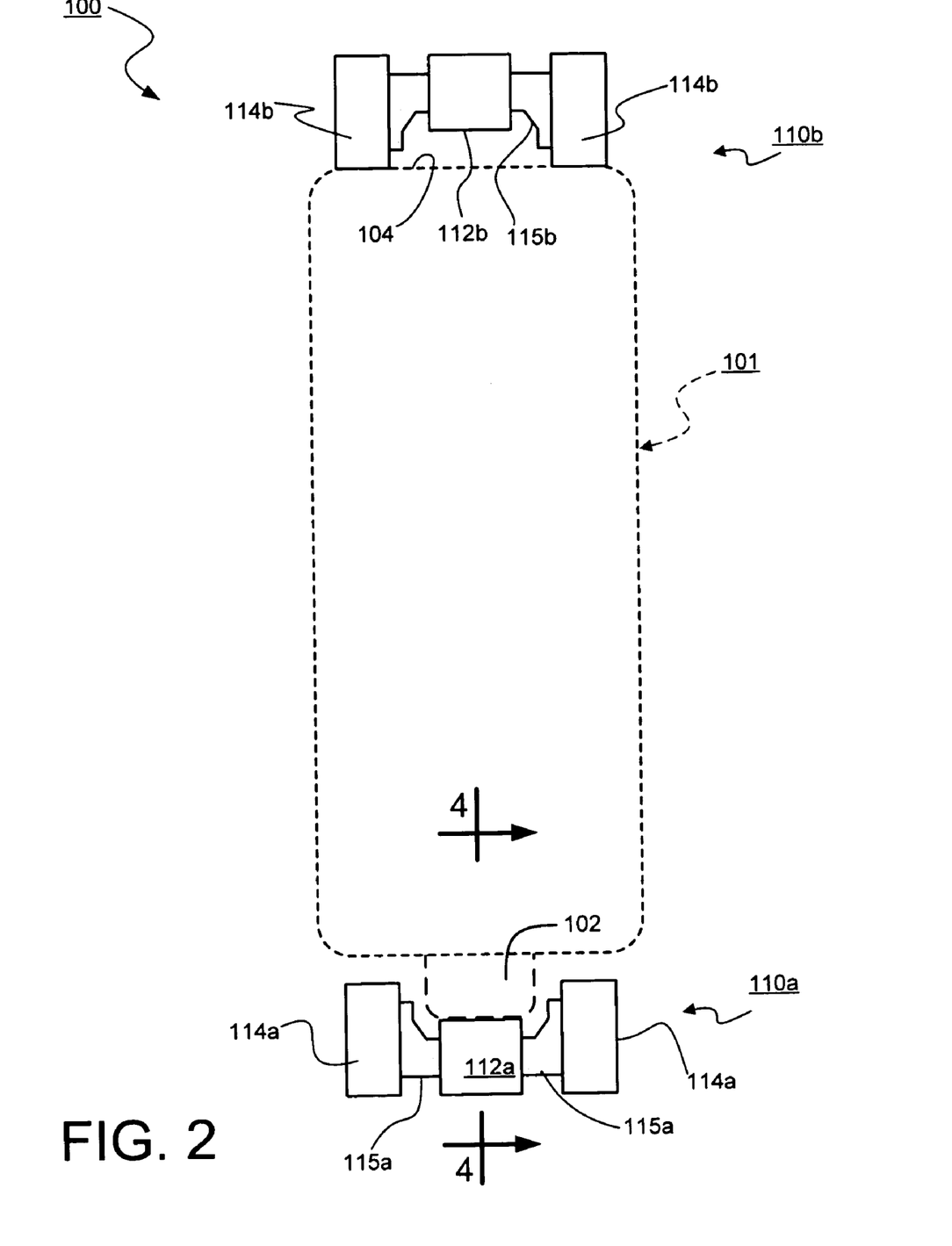
FIG. 2 is a top plan view of a battery receptacle.

2 as it might be disposed within a receptacle 100. These first and second dual-contact assemblies 110 are used one at each respective end of the battery 101; one assembly 110, here first assembly 110a, providing for surface contact with the protruding positive terminal 102 of a battery and the other assembly 110, here second assembly 110b, providing contact only with the substantially flat negative terminal 104 of the battery 101. Note, the convention of a protruding positive terminal and a flat negative terminal as used with the example battery 101 here is intended as an example only, and not to limit the scope of the present disclosure or the claims attached hereto. Indeed, a battery could have a positive flat terminal and a negative protruding terminal and still be useful with dual-contact assemblies such as those described here, recognizing the polarity would be reversed from that of the examples depicted here. The relative shapes of the dual-contact assemblies and the parts thereof would be operable in either case, in substantially the same manner as described here with only the electrical polarity differing.

Figure 3:
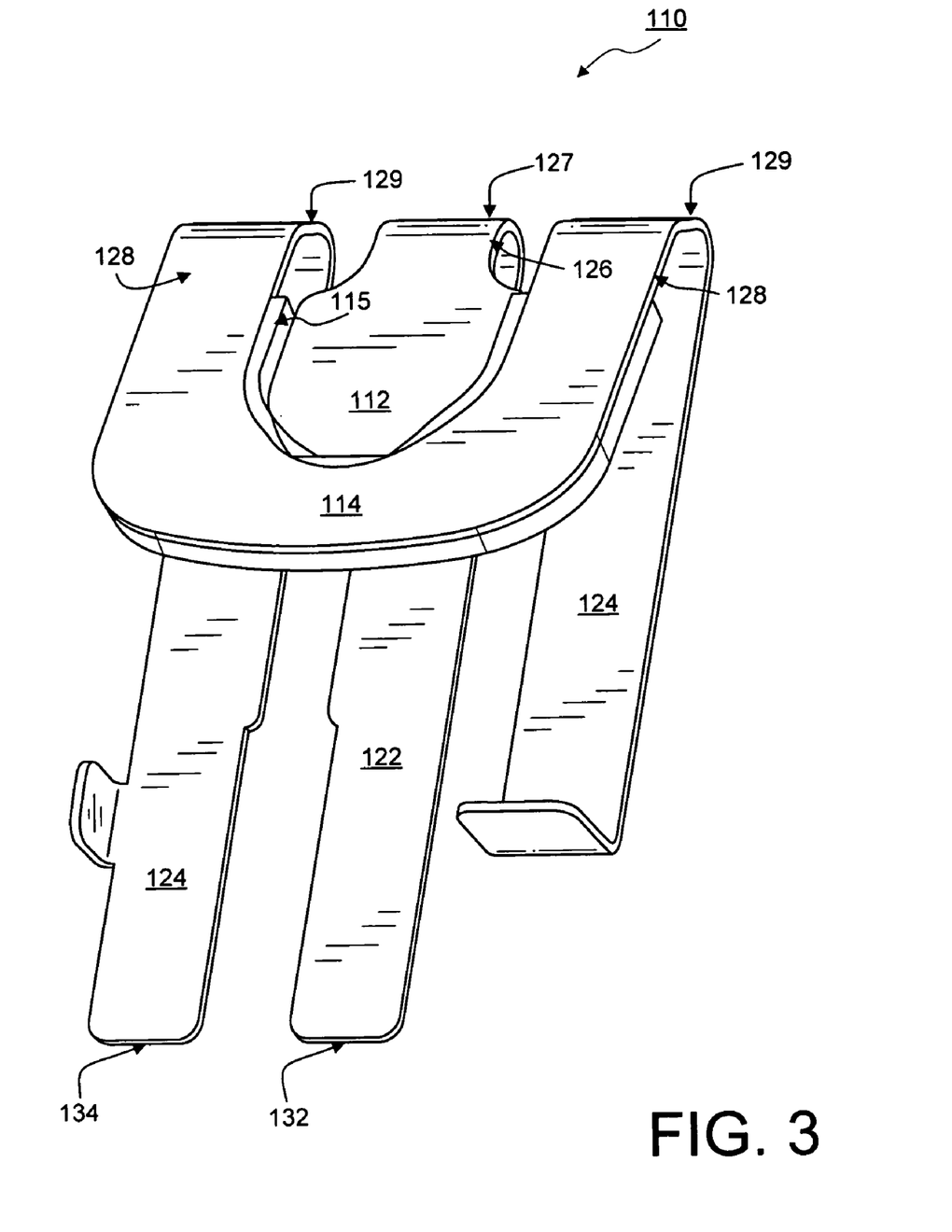
FIG. 3 is an isometric view of a resilient dual-contact assembly useful in or as part of a battery receptacle.

Each of the dual-contact assemblies, again generally designated 110, see also FIG. 3, has respective generally designated dual electrical contacts 112 and 114 separated by an insulating connector 115. As shown for example in FIGS. 1A and 3, a positive contact 112/112a is substantially centrally disposed and recessed within the assembly 110/110a, and a negative contact 114/114a is disposed more peripherally and not recessed. As shown in FIG. 1B, and more in FIGS. 2 and 4, a protruding positive terminal 102 of a battery 101 may reach into the central area of the contact assembly 110/110a to make contact with the positive contact 112/112a while the substantially flat negative terminal surface 104, see FIG. 2, of the battery 101 makes contact with the peripheral, non-recessed negative contact 114/114b. Moreover, at the first dual-contact assembly 110a (FIG. 2, e.g.), while the battery 101 contacts the positive contact 112a, it does not touch the negative contact 114a. And, at the other dual-contact assembly, i.e., the second dual-contact assembly 110b (FIG. 2, also), the battery 101 contacts the negative contact 114b, but does not in any way touch the positive contact 112b. Thus, when one battery terminal (positive or negative) is in electrical communication with one of the contacts (positive or negative) of a dual-contact assembly 110, the other respective contact (negative or positive) of that same dual-contact assembly is not in electrical communication with the battery 101. This is true as shown best in FIG. 2 for both ends of the battery 101; the negative terminal 104 of the battery is in contact with the negative contact 114 of one assembly 110, but not in contact with the positive contact 112 thereof. Meanwhile, the positive terminal 102 of the battery 101 is in contact with the positive contact 112 of the other assembly 110, but not in contact with the negative contact 114 thereof.

Figure 4A:
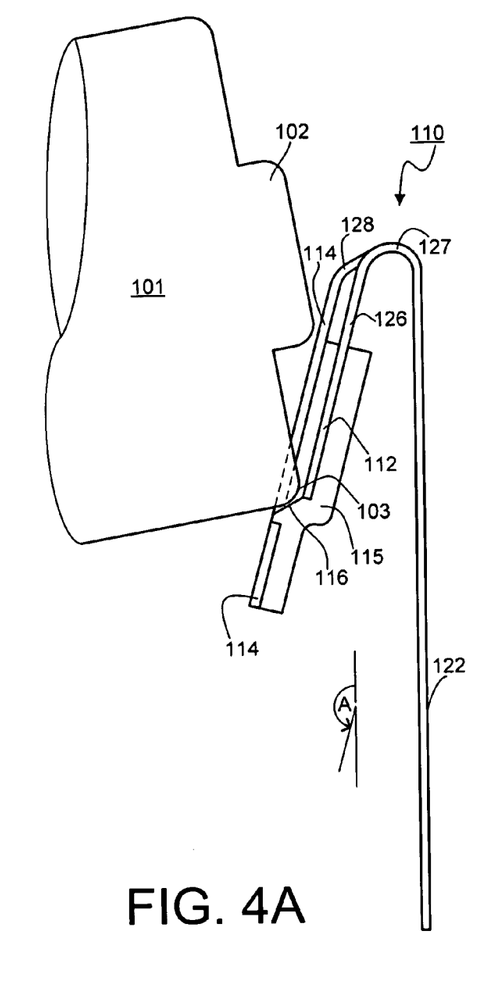
Figure 4B:
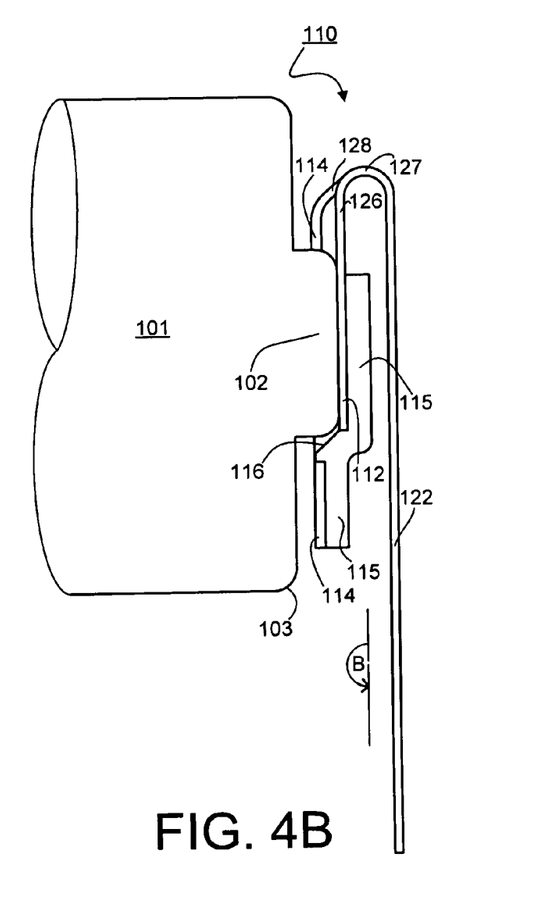

The battery contact assemblies 110 shown in FIGS. 14 (and FIG. 7, see description, below) are also flat or leaf springs, thus, are resilient dual-contact assemblies. FIGS. 1A, 3 and 4A show the springs in a relaxed, undepressed state, while FIGS. 1B, 2 and 4B show a battery 101 as inserted with the spring portions of the assemblies 110 depressed, as forced against the spring bias of the respective assemblies 110. Note, it may be that only one of a pair of first and second dual-contact assemblies is a resilient dual-contact assembly, although, it may be that both of a pair are resilient.

The resiliency or spring quality may be created by a leaf spring functionality, as by having some resiliency in one or the other of the positive or negative contacts 112, 114, or even in the insulating member 115. In many implementations hereof, resiliency will be provided by the bent over arms of one or both of the positive and/or negative contacts 112, 114.

As shown in FIGS. 3 and 4, the positive contact 112 includes a base portion 122 and a bent over portion 126, bent as shown in FIG. 4 at curved portion 127. The negative contact may similarly include a base portion 124, or as shown in FIG. 3, two base portions 124 and 124, with a bent over portion 128, as bent at curved portion 129. In the biased, relaxed position shown in FIGS. 1A, 3 and 4A, the relaxed, biased-position of the bend(s) as defined by the curved portions 127 and 129 is at some angle less than about 180 degrees (see e.g., angle A in FIG. 4A), whereas when in operative contact with a battery, as shown in FIGS. 1B and 4B, the angle of the depressed assembly more closely approximates 180 degrees (although there is no absolute limit on the degrees attained whether less than or greater than 180 degrees) (see angle B in FIG. 4B). The resiliency may be established by or as a characteristic of the material chosen for each of or one or more of the contacts 112 and/or 114. Certain metals, among other materials, can readily be formed into biased, relaxed state positions such as those shown in FIGS. 1A, 3 and 4A, and can be readily depressed to the positions shown in FIGS. 1B and 4B, and yet retain operability as electrical contacts for the functionality described herein.

FIG. 4 best shows a battery 101 in the insertion process into operative contact with a resilient dual-contact assembly 110. In FIG. 4A, a battery 101 is first brought into contact with a relaxed assembly 110 during insertion. Then, as the battery 101 is pushed downwardly, it also pushes the flat spring as represented by the bent over portions 126 and/or 128 of the contacts 112 and/or 114. The bent over portions 126 and 128 then deflect toward the respective base portions 122 and 124. It may be that either one or both of the bent over contacts 112 and 114 actually provide the resiliency to the respective dual-contact assembly, or it may be a non-conductive part, such as the insulating member 115 or otherwise which actually provides the resiliency to the respective dual-contact assembly; however, many implementations would have both bent portions 126 and 128 of respective contacts 112, 114 move when either is deflected. Thus, electrical communication will be with only one of the contacts 112 or 114 at any time.

The insulating member 115 provides electrical insulation so that no electrical communication will occur between the positive and negative contact members 112, 114. Many alternative materials may be used to provide this insulating, non-conductive functionality, many plastics among them. In many implementations, the insulating member 115 may act merely as an insulator; however the insulator 115 may also minimally maintain the contacts in a separated disposition relative to each other. Thus, as either or both of these contacts 112, 114 act as leaf spring contacts (or as coil springs, see alternative implementation(s), below), then the insulating member may further provide for connecting the contacts 112, 114 to each other so that they will move together, either as biased toward the relaxed position, or when forced, to the depressed operable position. This connected movability may support further the insulation of each from each other, so that when these contacts move together, they are maintained in a relatively constant distance from each other, neither of the contacts ever be movable closer to the other. Then the insulating member 115 is also an insulating connector 115, or an insulating connecting member 115.

Typically, this insulating connector provides a mechanical linking which for the embodiment of FIGS. 1-4 may be adhesively, or cohesively or otherwise simply interposed between and connecting the contacts 112, 114. Alternative connections are available, two of which being shown in the implementations of FIGS. 7, 8 and 9, for example, without any limitation thereto.

In some implementations, as shown for example in FIG. 4, the connector 115 (or some portion of the dual-contact assembly 110) may include a ramp portion 116 which may be operable to provide for a smooth engagement with the lip/corner 103 of the battery 101 during insertion and/or extraction of the battery 101 from the receptacle 100. The ramp 116 provides for little or no sharp or jagged edges which could interfere with and perhaps damage the lip 103 of the battery 101.

Figure 5A:
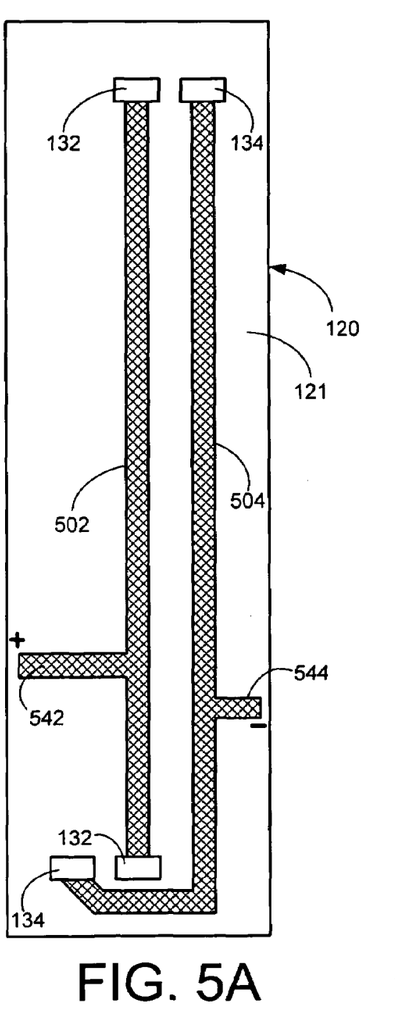
Figure 5B:
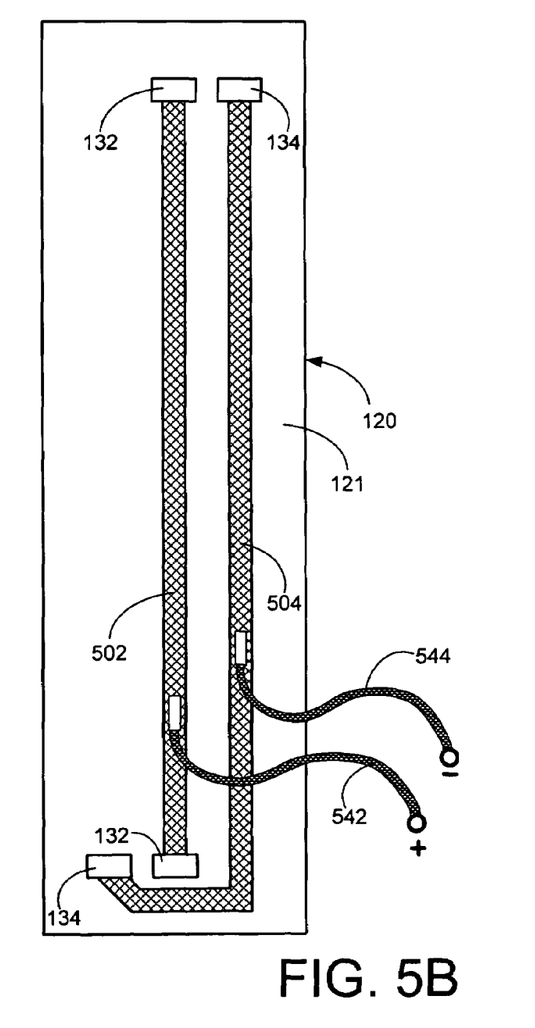

In some alternative production designs, the respective base legs 122, 124 may be through-hole components which can be soldered after being inserted through a printed circuit board (PCB), or otherwise connected to the electronic circuitry of the electronic device to which it is to be connected. Exemplar base ends 132, 134 are shown in FIG. 3, and as they may protrude (even though slightly exaggerated, here) through a substrate 120 and the PCB 121 in FIG. 1A. Then, shown in FIG. 5, i.e., in each of the sub-parts FIGS. 5A and 5B thereof, is an example of how these base ends 132, 134 may be connected mechanically and electrically to a PCB 121 in a substrate 120. As above, mechanically the substrate 120, which may include or be formed by the PCB 121, holds the first and second assemblies in relative space or in substantially fixed orientation relative to each other. Principally, in this implementation, the respective positive contacts 112a, 112b from both of the respective assemblies 110a, 110b may be disposed in through-hole position relative to the PCB 121, with each of their respective base ends 132 exposed therethrough. Then, these respective ends 132 can each be connected (as by soldering, e.g.) as shown in FIG. 5 (in both sub-parts FIGS. 5A and 5B) to a common trace 502 on the PCB, resulting in a single positive conductor as a power source to the product, i.e., a single positive circuit power connection. Likewise, the negative contacts 114a, 114b from both assemblies 110a, 110b can be connected to another common trace 504 via their respective exposed ends 134 on/through the PCB 121, resulting in a single negative conductor as a ground for the product, or, a single negative circuit power connection. Then, such a production solution could incorporate trace contacts or wire contacts, coiled wire contacts or other conductor configurations. Respective positive and negative trace contacts 542 and 544 are shown in FIG. 5A, and alternative positive and negative conducting wires 542 and 544 are shown in FIG. 5B as these might be connected (as by soldering, inter alia) to the respective traces 502, 504 on the PCB 121. Note, if a PCB trace connection method is used such as that shown in FIG. 5A, then the battery contact PCB could also be a portion of the PCB of the entire product, thus only one PCB need be used in the product. The circuit in such a case would not need soldered wires, but could use PCB traces directly on the same PCB. If on the other hand, wire connections 542, 544 are used, these wires 542, 544 may then run to and provide all the power connection necessary for any product or device to be powered by the battery or batteries hereof. Note, alternatives to PCB traces may include the use of wire connections, or even extensions of one or more of the respective legs of the respective positive and negative contacts, themselves.

Figure 6A:
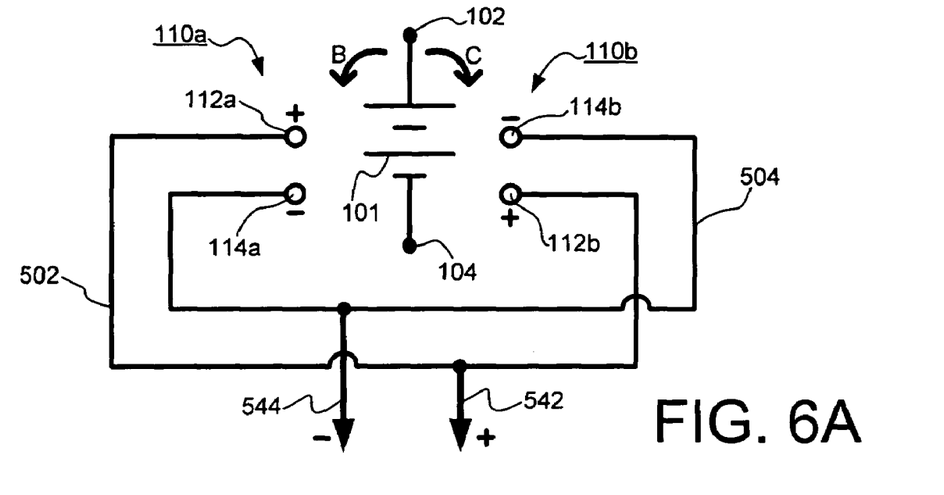
Figure 6B:
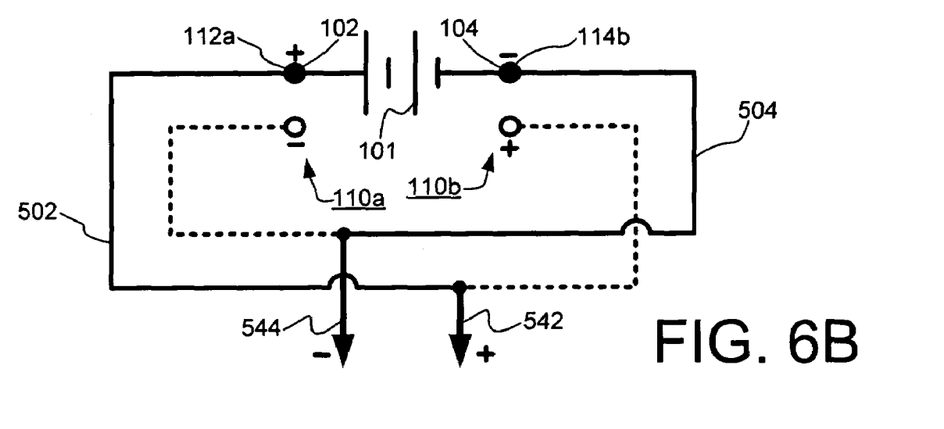
Figure 6C:
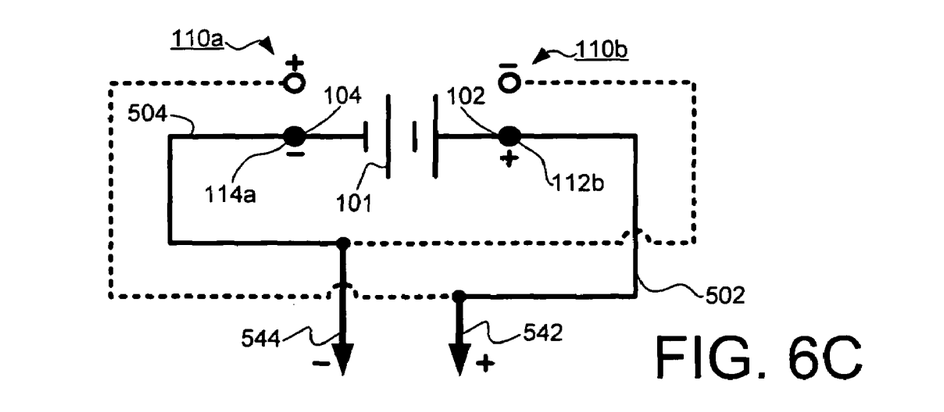

FIG. 6, which includes sub-part FIGS. 6A, 6B and 6C, displays schematics of how the electrical connections would be achieved using the mechanical connections of FIG. 5. In FIG. 6A, the electrical traces 502 and 504 are schematically shown as these are connected to the respective wire connections 542, 544 going to the electrical circuitry (not shown) of the device (also not shown) to be powered by the battery 101. A battery 101 is also shown schematically, and not connected to the circuitry in FIG. 6A. Also shown here are the respective dual-contact assemblies 110a, 110b with their respective positive contacts 112a, 112b and negative contacts 114a, 114b. The battery 101 is shown in a relatively neutral position in FIG. 6A, the respective positive and negative terminals 102, 104 not touching any of the contacts 112, 114 of the assemblies 110. Further indications are provided for the rotation of the battery either in direction B toward the connection shown in FIG. 6B, or in direction C toward the connection shown in FIG. 6C.

In FIG. 6B, the battery 101 is shown as it would be connected with the positive terminal 102 thereof contacting the positive contact 112a of the dual contact assembly 110a, while the negative terminal 104 of the battery 101 is contacting the negative contact 114b of the dual contact assembly 110b. A closed electrical path is shown in FIG. 6B by the solid line portions of the respective traces 502, 504, which thereby provide for electrical current flow to the respective positive and negative wire connections 542, 544. The unused contacts are still electrically connected to the ones that are used, but no current flows through the dashed lines since they do not form a closed circuit.

The substantially opposite orientation of the battery and current flow is shown in FIG. 6C, where the battery 101 is shown as it would be rotated in the C direction of FIG. 6A and thereby connected with the positive terminal 102 thereof contacting the positive contact 112b of the dual contact assembly 110b, while the negative terminal 104 of the battery 101 is in contact with the negative contact 114a of the dual contact assembly 110a. A closed electrical path is shown in FIG. 6C, contrary to that of FIG. 6B, by the solid line portions of the respective traces 502, 504, which thereby provide for electrical current flow to the respective positive and negative wire connections 542, 544. Here again, the unused contacts are still electrically connected to the ones that are used, but no current would flow through the dashed lines since they do not form a closed circuit. Note, there may be circumstances where it is desirable to not connect the respective positive and negative contacts by common traces or other similar connections, and rather activate one circuit when the battery is inserted in one orientation, and activate a different circuit then the battery is inserted in the opposite orientation.

According to this technology, a battery receptacle or battery compartment having a battery receptacle is set forth which provides for insertion of a battery in either of two opposing orientations, yet provides for appropriate current flow in either orientation. This substantially eliminates improper or incorrect installation of a battery. The spring functionality of one or both dual-contact assemblies then provides for containing batteries of various sizes within a certain range of tolerances. The spring functionality may also or alternatively provide for securely retaining the battery therewithin and providing continuous electrical contact and proper polarity current to the electrical device regardless of the orientation or often in spite of movement of the electrical device and the battery receptacle and battery therewithin.

Many typical uses may be with cylindrical or rectangular prism or other shaped batteries having a positive terminal with a protrusion at one end of the battery and a substantially flat surface negative terminal elsewhere on the battery, as at the opposite end of the battery. The dual-contact assemblies would then be disposed as shown in FIGS. 1 (and 9, described below) at opposing ends of a receptacle and a substrate thereof. Examples of such batteries may include, for example, those referred to as A, AA, AAA, AAAA, C, D or others of similar such sizes or shapes. Further examples might include those batteries known as coin or button batteries, inter alia. Note, though typical use might be with positive protrusion/ flat negative terminal batteries; the present devices and methods may be used with batteries having flat positive terminals and protruding negative terminals. The polarity of the circuitry would only be reversed. Moreover, though typical use might be with batteries having such terminals on opposing ends of a battery, these battery contacts need not be on opposite ends of the battery, but rather with terminals on the same side of the battery, or in other relative dispositions. Two dual-contact assemblies side by side could easily be adapted to accommodate a 9V or like type battery with terminals on the same side of the battery because one terminal may be made with a protrusion with a smaller diameter than the other terminal, just like a conventional double A ("AA") battery. Note further that conventional 9V batteries may have snap features not addressed hereby; although, addressed are 9V or like batteries which may have terminals on the same end with differing geometries such as shown and described.

As introduced above, the manufacture and/or joining of the respective parts of each dual-contact assembly involve an adhesive or cohesive approach, or other high volume joining techniques may be used for manufacture, such as heat-staking, injection molding, and/or mechanical bending of metal, or any other joining methods, including ultrasonic welding, or spin welding, inter alia. Some more detailed descriptions of alternative implementations of such battery receptacles and/or dual-contact assemblies useful therein, particularly with alternative formation approaches, are set forth below.

Figure 7A:
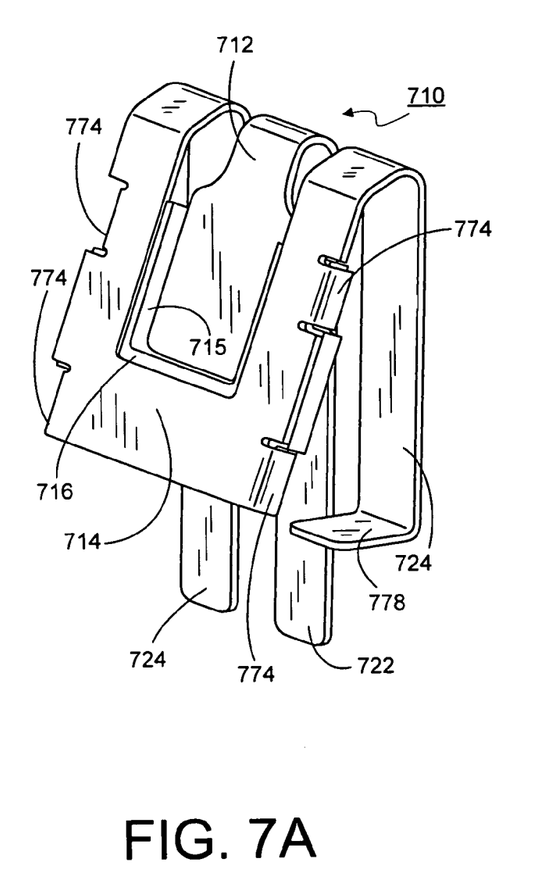
Figure 7B:
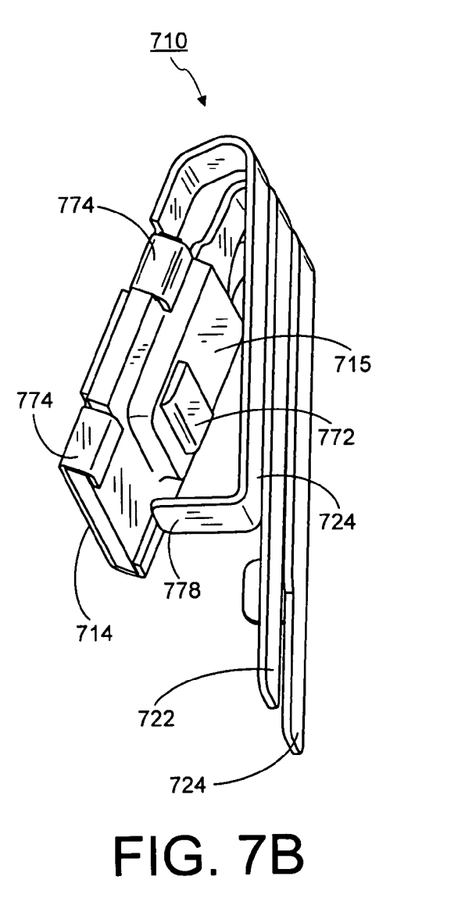
Figure 7C:
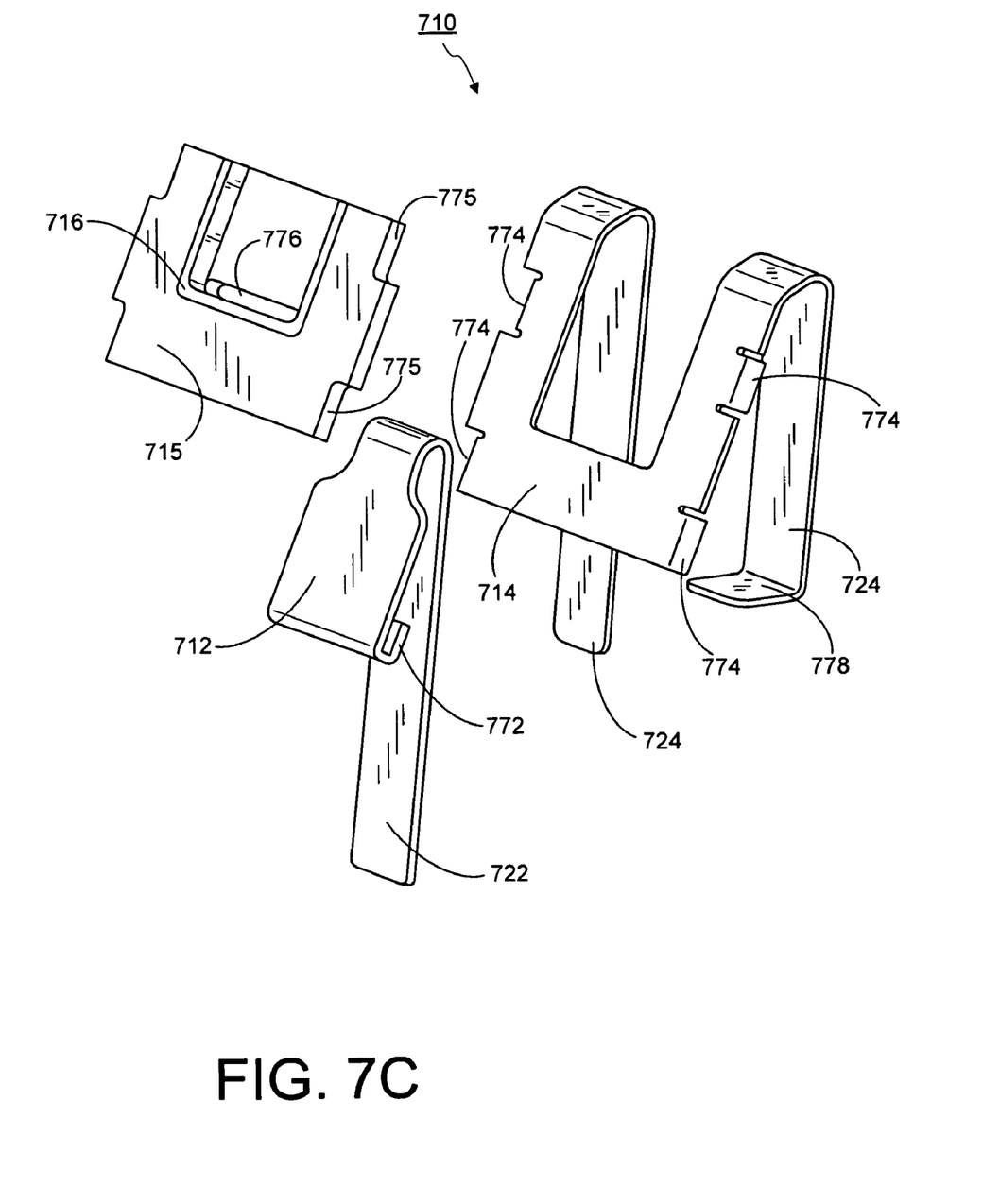

FIG. 7, including sub-part FIGS. 7A, 7B and 7C, provides isometric views of an alternative dual-contact assembly 710. This dual-contact assembly 710 includes respective positive and negative contacts 712 and 714, not unlike those of the implementations of FIGS. 1-4. Disposed between these contacts is a connector 715 which can provide insulation and connection functionality like that of the previously-described insulators. Also shown are the respective positive and negative conductive legs 722 and 724 of the contacts 712, 714. Additionally shown in this implementation are the connecting crimping member 772 and 774 which, during manufacture and use, secure the connection of the respective contacts 712 and 714 to the insulating connector 715. The view of FIG. 7C further particularly shows the respective crimping members 772, 774, as well as the respective receiving cutouts 775 and 776 formed in the connector 715. The receiving cutouts 775 may be reduced areas in edges of the connector 715, where the cutout 776 may be a through hole in the connector 715 to receive an insertion of the crimping member 772 of the positive contact 712. Note, such a connector 715 may be of a plastic or other insulating material, and may be molded (as by injection molding) into the form shown, or otherwise made, as by etching or other post-molding shape-forming methods. The respective contacts 712, 714 would typically be one-piece conductive materials formed to the shapes shown in FIG. 7, and may in many implementations be of a resilient metal, bent to the forms shown, and resilient to be deformable, yet biased to return to the unforced positions shown.

Also shown in FIG. 7 are alternative respective foot members 778 which may be useful for positioning the dual-contact assembly in/on a substrate, such as the substrate 120 of FIG. 1. One or more of such members 778 may be used for this purpose, and these may take various forms, as for example the member 778 which may rest on the substrate without providing a through-hole disposition of that respective leg 724. Another alternative feature shown in FIG. 7 is the ramp 716 formed in the connector 715 to provide the unimpeded engagement function as did the ramp 116 of the implementation of FIG. 4.

Figure 8A:
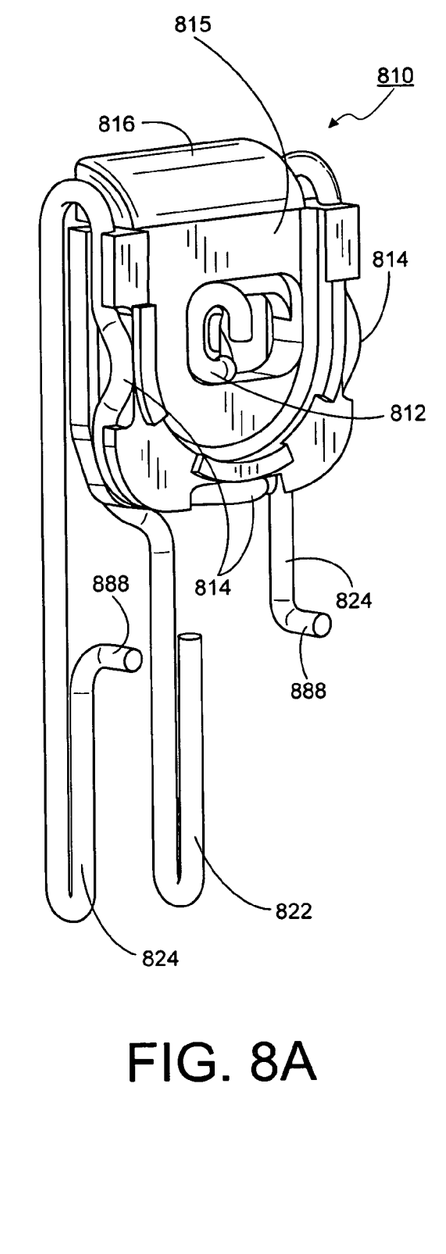
Figure 8B:
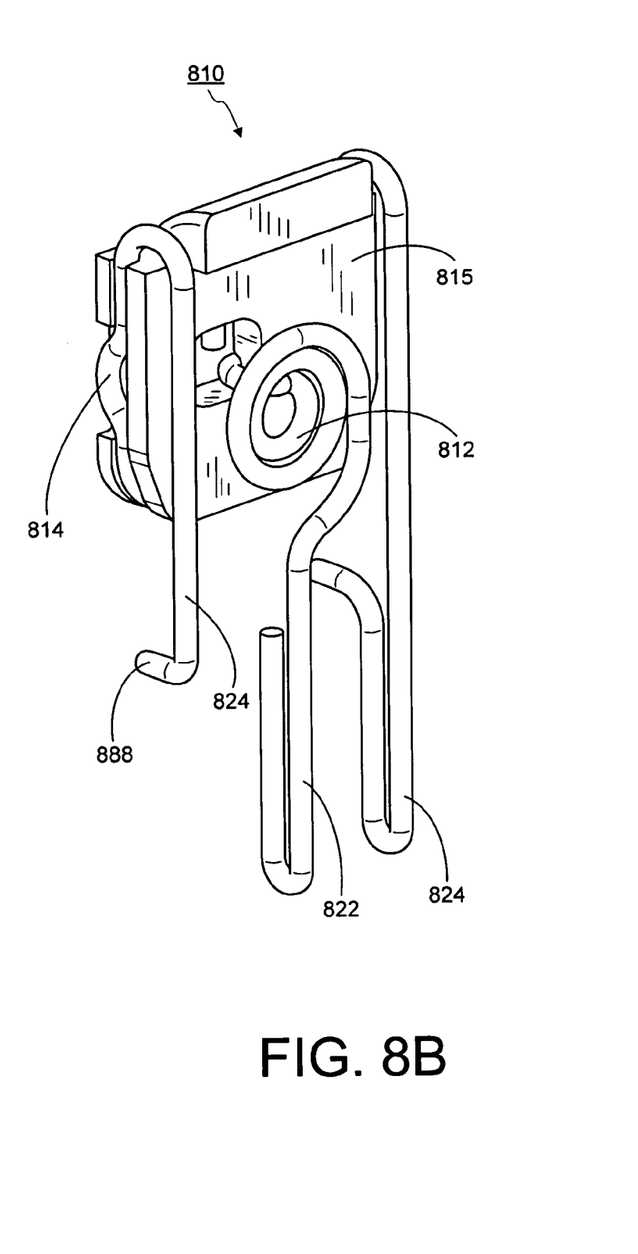

FIG. 8 provides views of another alternative dual-contact assembly 810. In this assembly 810, a coil spring positive contact 812 may be is used to mechanically bias the contacts relative to the battery to be connected therewith. In this version, the negative contact 814 may also provide a spring quality, or may merely rely upon the coil spring of the positive contact 812 for the biasing effect. The electrically insulating connector 815 hereof, would, as above, provide both the connecting function for connecting the positive and negative electrical contacts 812, 814 together, as well as insulating them from any electrical communication between these contacts. An alternative feature also shown in FIG. 8 is the ramp 816 formed in the connector 815 to provide the unimpeded engagement function as did the ramps 116 and 716 of the respective implementations of FIGS. 4 and 7.

Figure 8C:
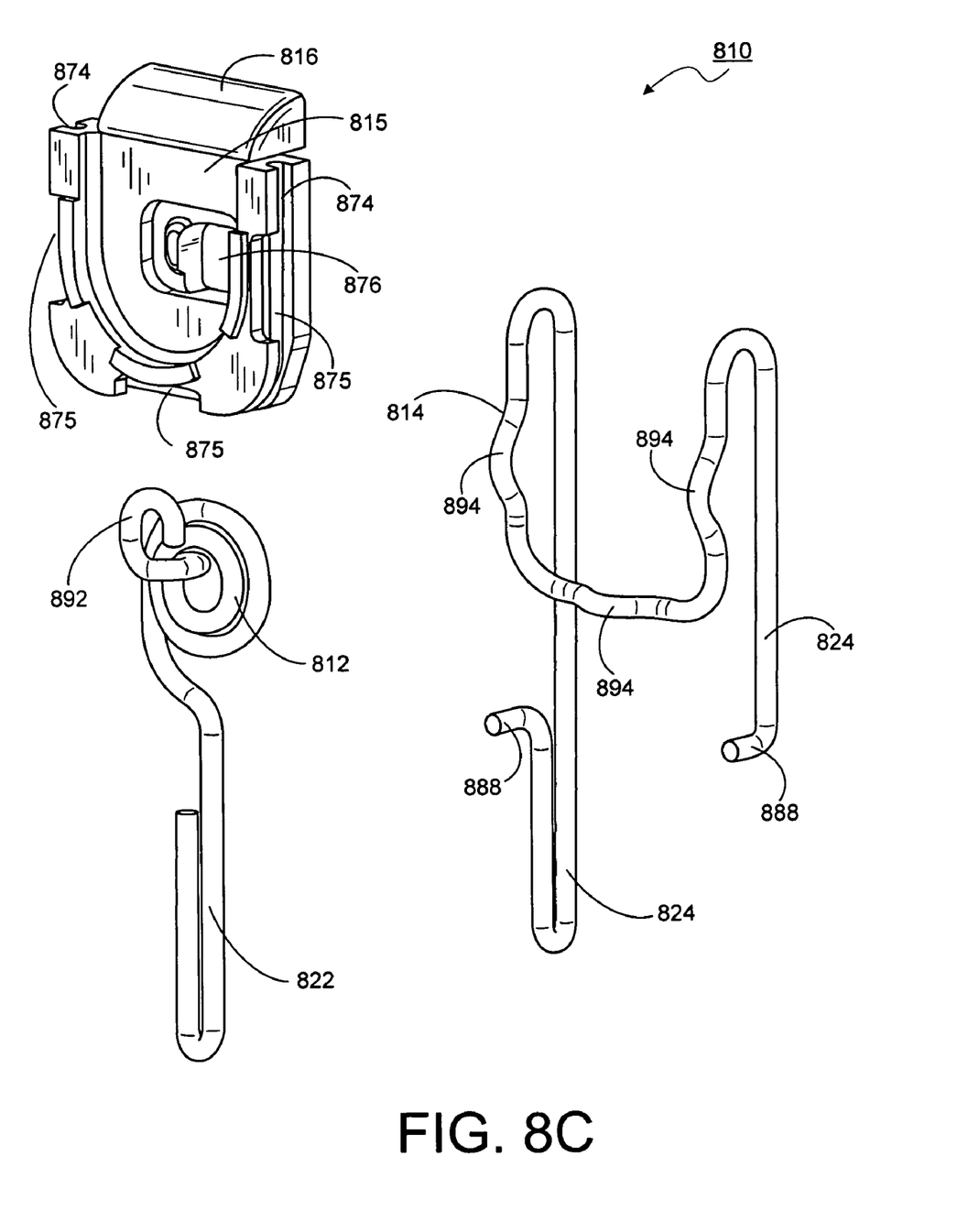

Further, positive and negative conductive legs 822 and 824 are also shown in FIG. 8, with the foot portions 888 of negative legs 824, for positioning relative to a substrate. As shown best in FIG. 8C, the respective positive and negative contacts 812, 814 and their corresponding conductive legs 822, 824 may be made of single continuous pieces of conductive material, such as certain metals, e.g, steel, spring steel, plated spring steel, beryllium, copper, among others. Moreover, the respective positive and negative contacts may be formed with one or more respective protruding portions 892, 894, which would provide sufficient protrusion relative to the connection member 815 to make contact with a battery brought into engagement therewith. These protrusions may coact with respective cutouts 876 and 875 in the connection member to also fix the respective contacts 812 and 814 with respect to the connection member. Crimping members or grooves 874 may also be provided in the connection member 815 to receive and hold the contacts 812, 814. Note, such a connector 815 may be of a plastic or other insulating material, and may be molded (as by injection molding) into the final form shown, or otherwise made, as by etching or other post-molding shape-forming methods. The respective contacts 812, 814 would typically be one-piece conductive materials formed to the shapes shown in FIG. 8, and may in many implementations be of a resilient, spring forming metal, such as wire or wire coil material, pre-bent to the forms shown, and resilient to be deformable, yet biased to return to the unforced positions shown.

Figure 9A:
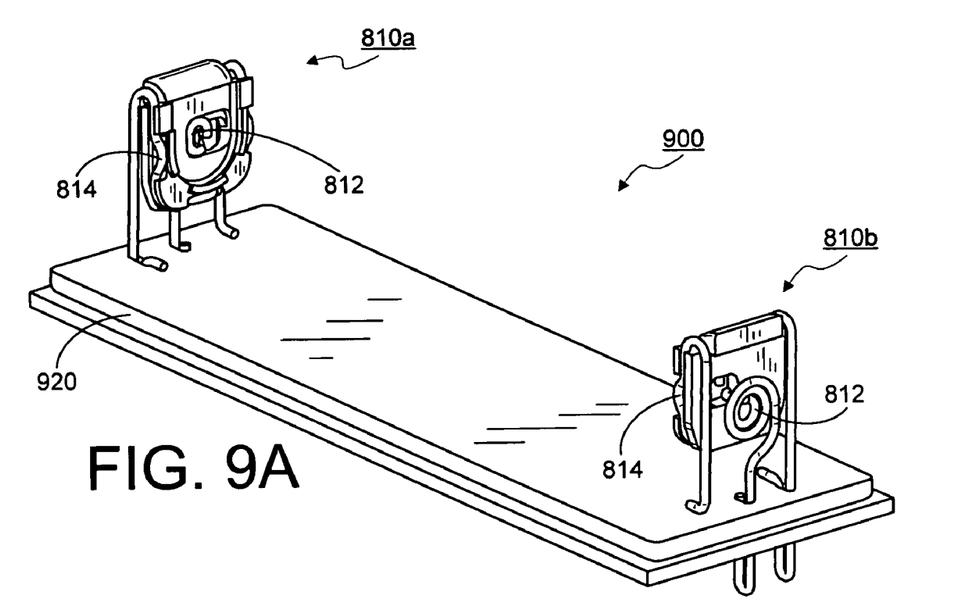
Figure 9B:
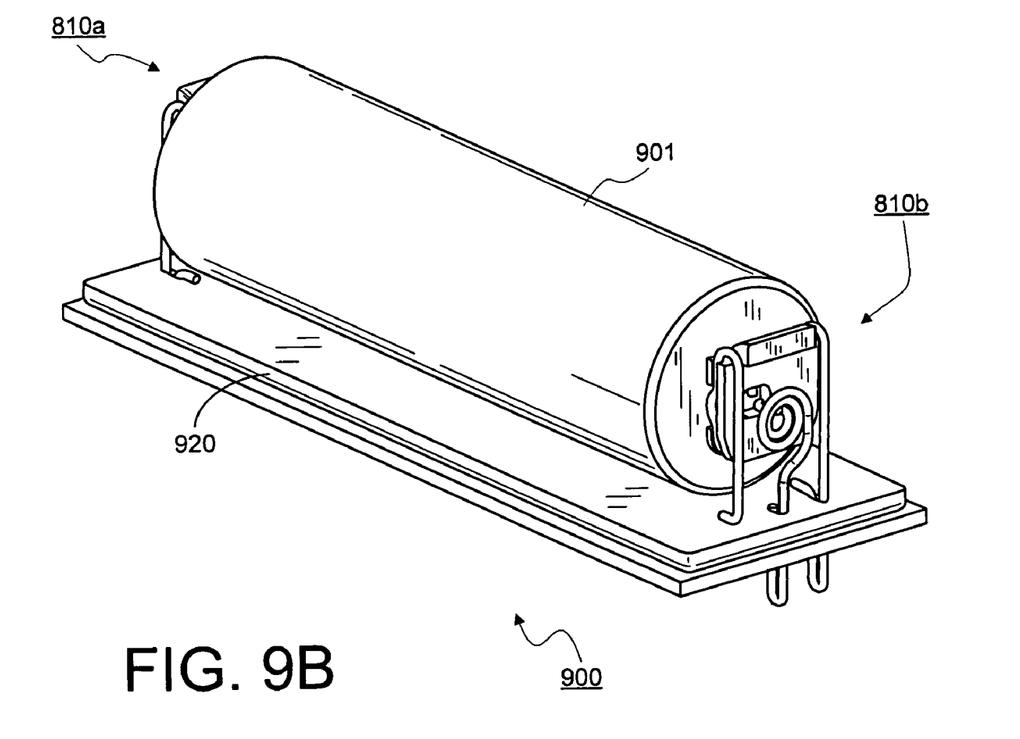

A resulting receptacle 900 is shown in FIG. 9, which includes sub-part FIGS. 9A and 9B. Two opposing dual-contact assemblies 810a and 810b are shown as attached to a substrate 920. The respective contacts 812, 814 are shown with and without a battery 901 disposed between them. Note, the contact assemblies 810a and 810b are shown in a state which may be compressed state in FIG. 9A (not unlike the compressed state shown with the battery in FIG. 9B), although such contact assemblies may rather exhibit an angularly un-forced or un-compressed state not unlike that of the alternative embodiments of FIGS. 1A, 3, 4A and 7, inter alia.

The result of each of these implementations is, as above, and as described herein, one or more dual-contact assemblies for use in or with a battery receptacle to allow batteries to be installed in any configuration, while still delivering predictable electrical current of the proper polarity at all times to the electrical device to be powered thereby. Elimination or substantial elimination of incorrect battery installation would thereby result.

A method for substantially eliminating incorrect battery installation may thus include employing two dual-contact assemblies, each of the dual-contact assemblies being disposed in a battery receiving disposition, each of the dual-contact assemblies including a positive contact, a negative contact, and an insulating connector disposed between and connecting each of the positive contact and the negative contact in an electrically insulating disposition relative to each other; wherein at least one of the first and second dual-contact assemblies is an inherently resilient dual-contact assembly; inserting, in any contact orientation, a battery between two opposing dual-contact assemblies; engaging the positive contact of one of the dual-contact assemblies with the positive terminal of the battery; and, engaging the negative contact of the other one of the dual-contact assemblies with the negative terminal of the battery.

The above specification provides a complete description of the structure and use of example implementations of the presently-described technology. Although various implementations of this technology have been described above with a certain degree of particularity, or with reference to one or more individual implementations, those skilled in the art could make numerous alterations to the disclosed implementations without departing from the spirit or scope of the technology hereof. Since many implementations can be made without departing from the spirit and scope of the presently described technology, the appropriate scope resides in the claims hereinafter appended. In particular, it should be understood that the described technology may be employed in virtually all, if not indeed, all electrical devices which receive power for whatever purpose from one or more batteries. Other implementations are therefore contemplated. Furthermore, it should be understood that any operations may be performed in any order, unless explicitly claimed otherwise or a specific order is inherently necessitated by the claim language. It is intended that all matter contained in the above description and shown in the accompanying drawings shall be interpreted as illustrative only of particular implementations and are not limiting to the embodiments shown. Changes in detail or structure may be made without departing from the basic elements of the present technology as defined in the following claims.

Accordingly, what is claimed is:

1. A battery receptacle comprising:
   a substrate; and
   first and second dual-contact assemblies, each of the first and second dual-contact assemblies being connected to the substrate in battery receiving disposition, each of said first and second dual-contact assemblies including:
   a positive contact,
   a negative contact, and
   an insulating connector disposed between and connecting each of the positive contact and the negative contact in an electrically insulating disposition relative to each other;
   wherein at least one of the first and second dual-contact assemblies is a resilient dual-contact assembly such that the positive contact, the negative contact and the insulating connector of the resilient dual-contact assembly are resiliently movable, the positive and negative contacts of the resilient dual-contact assembly comprising respective base portions contacting the substrate and respective bent portions biased away from the respective base portions, the insulating connector maintaining the positive and negative contacts of the resilient dual-contact assembly in an electrically insulated disposition relative to each other when the respective bent portions of the positive and negative contacts of the resilient dual-contact assembly are deflected toward the respective base portions of the positive and negative contacts of the resilient dual-contact assembly; and
   wherein each of the positive contacts of the respective first and second dual-contact assemblies is electrically connected to a positive circuit power connection, and each of the negative contacts of the respective first and second dual-contact assemblies is electrically connected to a negative circuit power connection.

2. A battery receptacle according to claim 1 wherein the first and second dual-contact assemblies are disposed in opposing relationship for receiving a battery having a positive terminal on one end and a negative terminal on an opposing end.

3. A battery receptacle according to claim 2 wherein each dual-contact assembly provides both a positive contact and negative contact at each respective end of the battery to be engaged thereby.

4. A battery receptacle according to claim 1 wherein the positive contact of at least one of the first and second dual-contact assemblies is recessed from the negative contact.

5. A battery receptacle according to claim 1 wherein the positive contact of at least one of the first and second dual-contact assemblies is recessed from the negative contact, the positive contact thereby disposed to receive a protruding positive terminal of a battery.

6. A battery receptacle according to claim 1 wherein the negative contact of at least one of the first and second dual-contact assemblies is adapted to engage a substantially flat negative terminal surface of a battery.

7. A battery receptacle according to claim 1 wherein both of the first and second dual-contact assemblies are each resilient, thereby forming first and second resilient dual-contact assemblies such that for each of the respective first and second resilient dual-contact assemblies each of the respective positive contacts, the respective negative contacts and the respective insulating connectors of the respective first and second resilient dual-contact assemblies are resiliently movable, the respective insulating connectors maintaining the respective positive and negative contacts of the respective first and second resilient dual-contact assemblies in an electrically insulated disposition relative to each other.

8. A battery receptacle according to claim 1 wherein the resilient dual-contact assembly is formed with at least one inherent flat spring, leaf spring, wire spring, or coil spring.

9. A battery receptacle according to claim 8 wherein the at least one inherent flat spring, leaf spring, wire spring, or coil spring forms at least one of the positive contact, the negative contact and the insulating connector of the resilient dual-contact assembly.

10. A battery receptacle according to claim 8 wherein the at least one inherent flat spring, leaf spring, wire spring, or coil spring is formed from a conductive material.

11. A battery receptacle according to claim 8 wherein the at least one inherent flat spring, leaf spring, wire spring, or coil spring is formed from a unitary piece.

12. A battery receptacle according to claim 1 wherein the insulating connector of at least one of the first and second dual-contact assemblies is a plastic insulator.

13. A battery receptacle according to claim 1 wherein the insulating connector, the positive contact and the negative contact of at least one of the first and second dual-contact assemblies are mechanically joined using an adhesive, cohesive, heat staking, injection molding, mechanical bending of material, ultrasonic welding, or spin welding.

14. A battery receptacle according to claim 1 wherein the insulating connector of at least one of the first and second dual-contact assemblies includes a ramp portion to aid in battery insertion and prevent damage to lip of battery.

15. A battery receptacle according to claim 1 wherein each of the positive contacts of the respective first and second dual-contact assemblies is directly electrically coupled to each other and to a single positive circuit power connection, and each of the negative contacts of the respective first and second dual-contact assemblies is directly electrically coupled to each other and to a single negative circuit power connection.

16. A battery receptacle according to claim 1 wherein each of the positive contacts of the respective first and second dual-contact assemblies is directly electrically coupled to each other and to a single positive circuit power connection via connection of the respective positive contacts themselves, wires, or PCB traces, and each of the negative contacts of the respective first and second dual-contact assemblies is directly electrically coupled to each other and to a single negative circuit power connection via connection of the respective negative contacts themselves, wires, or PCB traces.

17. A battery receptacle according to claim 1 wherein the positive contacts of the respective first and second dual-contact assemblies are not directly electrically coupled to each other and are each respectively connected to a discrete separate circuit, and each of the negative contacts of the respective first and second dual-contact assemblies are not directly electrically coupled to each other and are each respectively connected to a discrete separate circuit.

18. An inherently resilient dual-contact assembly for use in a battery receptacle, the dual-contact assembly comprising:
   a positive contact,
   a negative contact, and
   an insulating connector disposed between and connecting each of the positive contact and the negative contact in an electrically insulating disposition relative to each other;
   wherein the positive contact is recessed from the negative contact to receive a protruding positive terminal of a battery;
   wherein the negative contact is adapted to engage a substantially flat negative terminal surface of a battery; and
   wherein the positive contact, the negative contact and the insulating connector are resiliently movable, the positive and negative contacts of the resilient dual-contact assembly comprising respective base portions and respective bent portions biased away from the respective base portions, the insulating connector maintaining the positive and negative contacts of the resilient dual-contact assembly in an electrically insulated disposition relative to each other when the respective bent portions of the positive and negative contacts of the resilient dual-contact assembly are deflected toward the respective base portions of the positive and negative contacts of the resilient dual-contact assembly.

19. A dual-contact assembly according to claim 18 further comprising at least one inherent flat spring, leaf spring, wire spring, or coil spring.

20. A method for substantially eliminating incorrect battery installation comprising:
   inserting, in any contact orientation, a battery between two opposing dual-contact assemblies, each of the dual-contact assemblies being disposed in a battery receiving disposition, each of the dual-contact assemblies including a positive contact, a negative contact, and an insulating connector disposed between and connecting each of the positive contact and the negative contact in an electrically insulating disposition relative to each other; wherein at least one of the first and second dual-contact assemblies is an inherently resilient dual-contact assembly such that the positive contact, the negative contact and the insulating connector are resiliently movable, the positive and negative contacts of the resilient dual-contact assembly comprising respective base portions and respective bent portions biased away from the respective base portions, the insulating connector maintaining the positive and negative contacts of the resilient dual-contact assembly in an electrically insulated disposition relative to each other when the respective bent portions of the positive and negative contacts of the resilient dual-contact assembly are deflected toward the respective base portions of the positive and negative contacts of the resilient dual-contact assembly;
   engaging the positive contact of one of the dual-contact assemblies with the positive terminal of the battery; and,
   engaging the negative contact of the other one of the dual-contact assemblies with the negative terminal of the battery.

* * * * *